UNITED STATES PATENT OFFICE.

ALEXANDER P. ASHBOURNE, OF OAKLAND, CALIFORNIA.

IMPROVEMENT IN PROCESSES OF TREATING COCOA-NUT.

Specification forming part of Letters Patent No. 194,287, dated August 21, 1877; application filed November 27, 1876.

*To all whom it may concern:*

Be it known that I, ALEXANDER P. ASHBOURNE, of Oakland, in the county of Alameda and State of California, have invented a new and useful Improvement in the Process for Treating Cocoa-Nut; and I do hereby declare the following to be a clear and exact description of the nature thereof, sufficient to enable others skilled in the art to which my invention appertains to fully understand, make, and use the same.

My invention consists of a mode of treating cocoa-nut whereby the meat will be better preserved, and it will retain its flavor and sweetness, and the oil will be fine, clear, and white.

I take a sufficient quantity of nuts and pare and grate or pulverize them. The meat is now passed through screens or sieves, and steamed for one hour. Then add one gallon of boiling water to one hundred pounds of meat, and the action of the boiling water will extract from the meat one-third of its oil. Then press the meat perfectly dry and cure it with one pound of sugar and the white of one egg, dried and ground, to each three pounds of meat, after which the mass is placed in a drying-machine and slowly dried for the space of eight hours, thus rendering it fit for packing.

It will be seen that by this process a portion of the oil has been removed from the meat, the latter will not materially lose any of its fine qualities, but at the same time it adds preservative qualities to the meat, so that it will not become rancid or lose its flavor or sweetness.

The oil that is extracted from the already formed meat is now placed in boiling water, then skimmed and strained, thus separating the oil from the water, after which place the hot oil in a kettle and boil it down for three hours, whereby the filthy matters or mother—the substance liable to rancidity—will sink to the bottom. Now skim the pure oil and place it in a hot kettle, and cure it by adding to each gallon of oil the whites or shells (or both) of three eggs, one-half ounce of alum, a teaspoonful of white sugar, and then boil the mass over a slow fire for the space of five hours, after which the oil will be removed, cooled, and it may be bottled or otherwise packed, or remain in bulk, as desired or required.

It will be seen that the oil is fine, clear, and perfectly white, and not liable to become rancid, and it is applicable for toilet, medical, and domestic purposes.

I do not desire to be understood as herein making any claim to the process of treating the oil remaining after treatment of the cocoa-nut meat. This process I propose to make the subject of a separate application for Letters Patent.

Having thus described my invention, what I claim as new, and desire to secure by Letters Patent, is—

The process of treating cocoa-nut meat, which consists in grating or pulverizing the cocoa-nut, steaming for a short period, extracting a portion of the oil by boiling water, pressing, and finally curing by adding sugar and albumen of egg when the product is thoroughly dried, substantially as described.

ALEXANDER P. ASHBOURNE.

Witnesses:
JOHN A. WIEDERSHEIM,
NEWTON McADOO.